J. L. CECIL.
TIRE FASTENING MEANS FOR VEHICLE WHEELS.
APPLICATION FILED MAY 24, 1912.
1,100,534. Patented June 16, 1914.
2 SHEETS—SHEET 1.
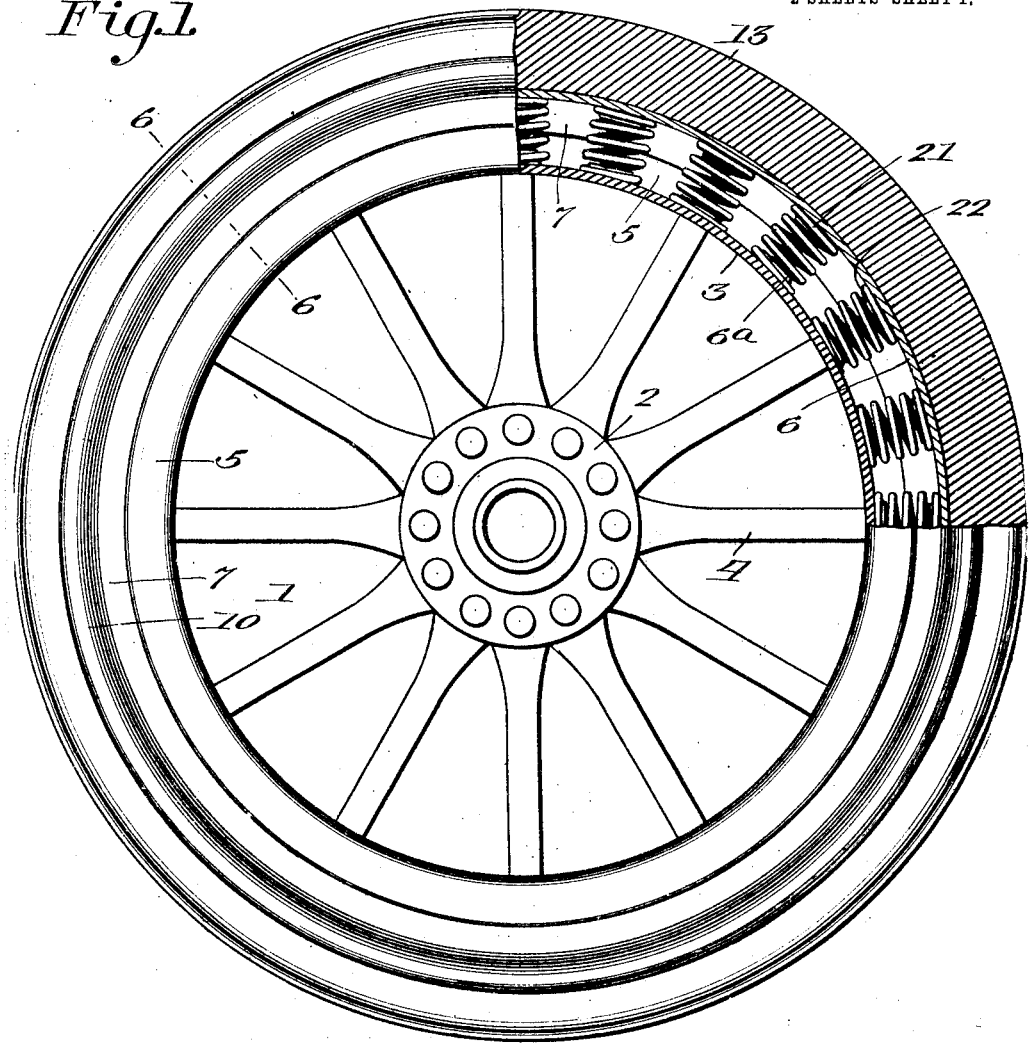
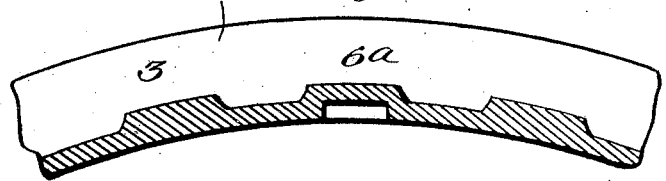

J. L. CECIL.
TIRE FASTENING MEANS FOR VEHICLE WHEELS.
APPLICATION FILED MAY 24, 1912.
1,100,534.
Patented June 16, 1914.
2 SHEETS—SHEET 2.
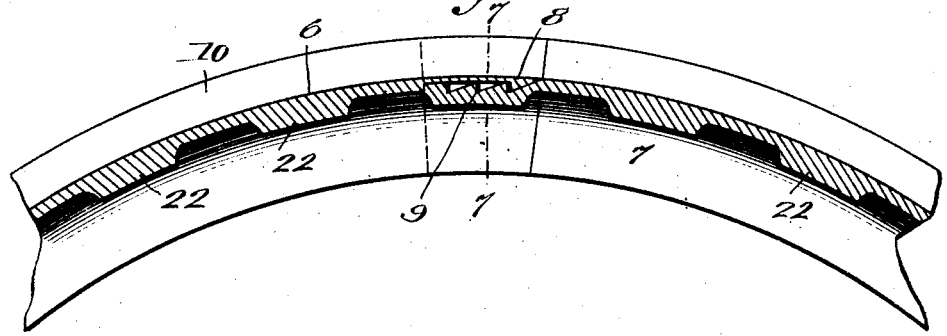
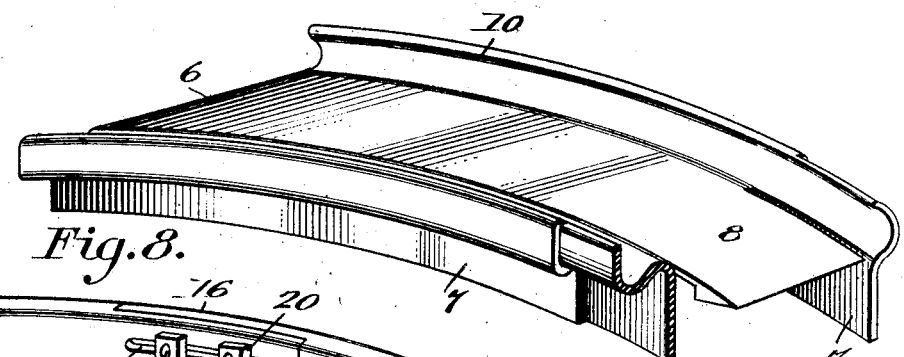
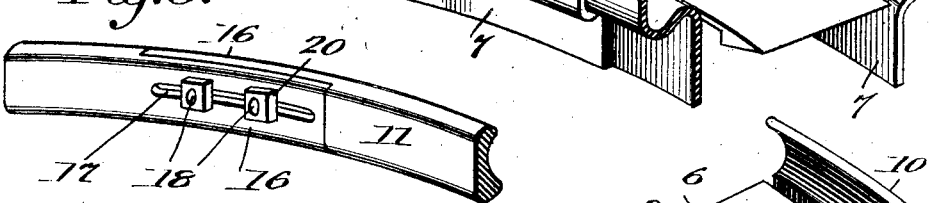
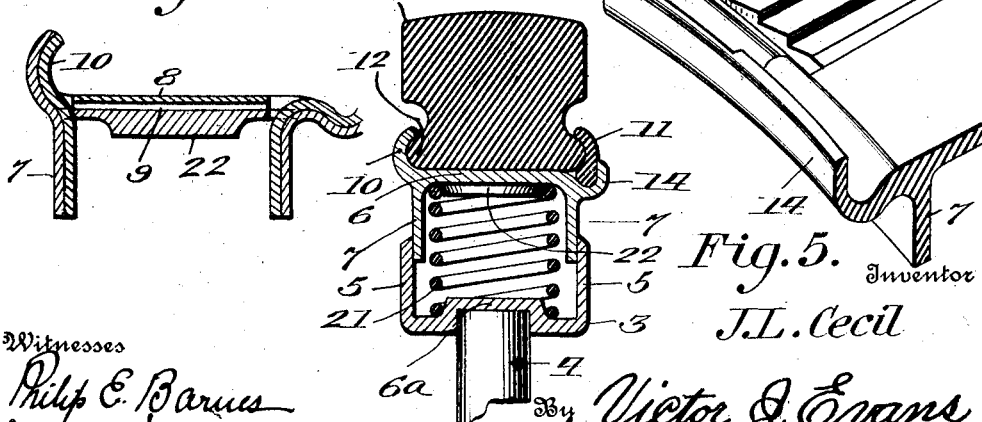
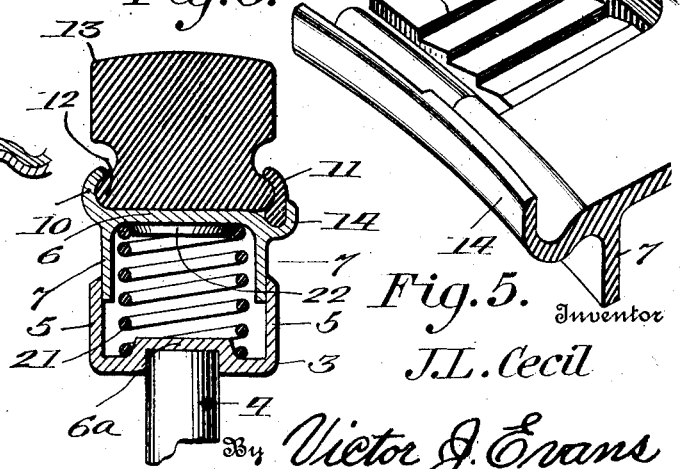
Inventor
J. L. Cecil
By Victor J. Evans
Attorney
Witnesses
Philip E. Barnes
James Koell

UNITED STATES PATENT OFFICE.

JESSE L. CECIL, OF TIPPECANOE, OHIO.

TIRE-FASTENING MEANS FOR VEHICLE-WHEELS.

1,100,534.      Specification of Letters Patent.      Patented June 16, 1914.

Application filed May 24, 1912. Serial No. 699,427.

*To all whom it may concern:*

Be it known that I, JESSE L. CECIL, a citizen of the United States, residing at Tippecanoe, in the county of Harrison and State of Ohio, have invented new and useful Improvements in Tire-Fastening Means for Vehicle-Wheels, of which the following is a specification.

An object of the invention is to provide a construction of fastening means which will permit of the quick and convenient attachment of the tire thereto or the removal of the same therefrom.

A still further object of the invention is to provide a tire support for the wheel which is susceptible of circumferential expansion or contraction whereby it may be readily made to accommodate itself to the tire.

A still further object of the invention is to provide means whereby the tire support will be effectually held against accidental lateral displacement from the rim.

In the drawing forming a portion of this application, and in which like letters of reference indicate similar parts in the several views:—Figure 1 is a side view of the wheel showing parts in section. Fig. 2 is a longitudinal section through a portion of the rim. Fig. 3 is a longitudinal section through the interfitting ends of the tire support. Fig. 4 is a perspective view of the dog end of one terminal of the tire holder. Fig. 5 is a perspective view of the toothed end of the tire holder. Fig. 6 is a section on line 6—6 of Fig. 1. Fig. 7 is a transverse section on line 7—7 of Fig. 3. Fig. 8 is a sectional perspective view of a portion of the tire retaining ring.

The vehicle wheel 1 herein shown includes a central hub 2, a rim 3 and radial spokes 4 for connecting the hub with the rim. The rim 3 is of channel or U-configuration in transverse section as shown in Fig. 6, being provided with spaced parallel side flanges 5 and radial bosses 6ª.

The tire holder or support embraces the rim 3, being movable yieldingly radially upon the same and having spaced side flanges 7 that extend into the channel of the rim for sliding contact against the flanges 5. The tire support 6 is adjustable circumferentially of the rim 3 and as illustrated one terminal of the support is provided with a springy locking dog 8 which is designed to adjustably engage the transverse teeth 9 on the opposite terminal of the support. The support is provided with flanges 10 and 11 which are adapted to engage similar flanges 12 upon a cushioning tire 13. The flange 11 is removably mounted in the groove 14 of the tire holder and it is provided with interfitting terminals 16, one of which is slotted as at 17. One of the terminals is provided with studs 18 that extend through a longitudinal slot 17 in the other terminal. These studs have clamping nuts 20 thereon which are operable to clamp the interfitting terminals together and thereby hold the flange in an adjusted position.

Helical extensile springs 21 are disposed radially of the rim 3, the inner ends of the springs being associated with the bosses 6ª while the outer ends of the springs are associated with similar bosses 22 which extend inwardly from the tire holder.

From the construction described it is evident that the tire holder or support can be readily attached to or removed from the rim of the wheel as the occasion may demand. It may also be stated that the construction of the holder will permit of its being circumferentially expanded or contracted manually whereby it may readily accommodate itself to the tire. Solid cushioning tires are liable to circumferential creeping upon the wheel and slight radial buckling or distortion but as stated the holder described herein is susceptible of such circumferential adjustment that it may be made to accommodate itself to the tire at all times whereby the latter will be held in a uniform manner upon the former and against accidental displacement therefrom. Circumferential adjustment of the tire holder, also, in a measure will permit of slight tensioning of the springs.

I claim:—

A tire holder for vehicle wheels, comprising, a member split transversely and adjustable around the rim and provided with overlapping ends, one of the ends having a series of transversely arranged teeth, the other end having a springy locking dog for engaging the teeth of the first end and coöperating therewith to hold both ends against relative separation, the said member having a
5 continuous flange located beyond the ends of the teeth, and an adjustable member embracing the first member and fitting against the flange thereof and coöperating with the interfitting teeth and locking portions of the first member to hold the ends of said 10 first member against lateral separation.

In testimony whereof I affix my signature in presence of two witnesses.

JESSE L. CECIL.

Witnesses:
  ALICE M. HINES,
  GEO. W. HINES.

Copies of this patent may be obtained for five cents each, by addressing the "Commissioner of Patents, Washington, D. C."